(12) United States Patent
Lipps

(10) Patent No.: US 6,385,505 B1
(45) Date of Patent: May 7, 2002

(54) METHODS AND APPARATUS FOR DISPENSING ITEMS

(75) Inventor: Randall A. Lipps, Menlo Park, CA (US)

(73) Assignee: Omnicell.com, Palo Alto, CA (US)

( * ) Notice: Subject to any disclaimer, the term of this patent is extended or adjusted under 35 U.S.C. 154(b) by 0 days.

(21) Appl. No.: 08/320,585

(22) Filed: Oct. 11, 1994

Related U.S. Application Data

(63) Continuation of application No. 08/095,619, filed on Jul. 21, 1993, now abandoned.

(51) Int. Cl.[7] .............................................. G07F 11/00
(52) U.S. Cl. .................. 700/231; 700/236; 700/240; 700/241; 221/2; 221/4; 221/68; 221/98
(58) Field of Search .................. 364/468, 478, 364/479; 221/153, 154, 2, 3, 9, 95, 155, 159, 131, 194, 195, 197, 4, 68, 98; 235/385; 700/231, 236, 240, 241

(56) References Cited

U.S. PATENT DOCUMENTS

| | | | |
|---|---|---|---|
| 3,556,342 A | 1/1971 | Guarr .............................. 221/2 |
| 3,715,148 A | 2/1973 | Beals .......................... 312/209 |
| 3,917,045 A | 11/1975 | Williams et al. ................ 194/4 |
| 4,019,793 A | 4/1977 | Gerding ....................... 312/209 |
| 4,021,644 A * | 5/1977 | Dreslinski ..................... 235/92 |
| 4,267,942 A | 5/1981 | Wick, Jr. et al. ................ 221/2 |
| 4,360,125 A | 11/1982 | Martindale et al. ............. 221/2 |
| 4,473,884 A | 9/1984 | Behl .......................... 364/479 |
| 4,635,053 A | 1/1987 | Banks et al. ............ 340/825.31 |
| 4,639,875 A * | 1/1987 | Abraham et al. .............. 377/15 |
| 4,695,954 A | 9/1987 | Rose et al. ................... 364/413 |
| 4,737,910 A * | 4/1988 | Kimbrow ..................... 364/403 |
| 4,783,740 A * | 11/1988 | Ishizawa et al. ......... 235/385 X |
| 4,785,969 A | 11/1988 | McLaughlin ................... 221/2 |
| 4,811,764 A | 3/1989 | McLaughlin ................. 141/98 |
| 4,847,764 A | 7/1989 | Halvorson ............. 364/413.02 |
| 4,942,275 A | 7/1990 | Addy et al. .................. 200/308 |
| 4,962,491 A * | 10/1990 | Schaeffer ..................... 368/21 |
| 4,967,928 A | 11/1990 | Carter ........................... 221/2 |
| 5,014,875 A * | 5/1991 | McLaughlin et al. ... 364/479 X |
| 5,047,948 A * | 9/1991 | Turner ......................... 364/479 |
| 5,055,660 A | 10/1991 | Bertagna et al. ............ 235/472 |
| 5,069,511 A | 12/1991 | Swets et al. ............. 312/107.5 |
| 5,097,982 A * | 3/1992 | Kedem et al. .................. 221/3 |
| 5,150,817 A * | 9/1992 | Livingston ................... 221/81 |
| 5,176,285 A * | 1/1993 | Shaw ............................. 221/3 |
| 5,221,024 A * | 6/1993 | Campbell ....................... 221/3 |
| 5,259,668 A | 11/1993 | Teufel et al. .......... 312/249.11 |
| 5,263,596 A * | 11/1993 | Williams .................... 221/153 |
| 5,267,174 A | 11/1993 | Kaufman et al. ........... 364/479 |
| 5,314,243 A * | 5/1994 | McDonald et al. ......... 221/2 X |
| 5,346,297 A * | 9/1994 | Colson, Jr. et al. ......... 312/215 |

* cited by examiner

*Primary Examiner*—Reba I. Elmore
(74) *Attorney, Agent, or Firm*—Townsend and Townsend and Crew LLP

(57) ABSTRACT

The invention provides methods and apparatus for dispensing items from a dispensing unit. According to the invention, the dispensing unit comprises a plurality of locations in which the items are held, a processor in which records corresponding to the items on the unit are stored, and a plurality of item switches corresponding to the locations in which the items are held. The item switches are connected to the processor so that a user of the dispensing unit can input records of items removed from the unit into the processor. The apparatus described is particularly suited for dispensing medical supplies although the apparatus will be usable for other types of items as well. Preferred embodiments will include a plurality of visual indicators, typically in the form of light emitting diodes, corresponding to the locations in which the items are held. Upon selection of a desired item from a list of items held by the unit, the visual indicator corresponding to the item is actuated so that the user can locate the desired item quickly and conveniently with the help of the visual indicator.

23 Claims, 10 Drawing Sheets

```
[A] [B] [C] [D] [E] [F] [G] [H] [I]
[J] [K] [L] [M] [N] [O] [P] [Q] [R]
[S] [T] [U] [V] [W] [X] [Y] [Z] [_]

TOUCH FIRST LETTER OF LAST NAME
```

| EXIT | | NEW PATIENT |

NAME:__
```

| EXIT | BACK | ENTER |

FIG. 8.

ITEMS FOR:
PATIENT NAME
ITEM NAME                    FIND ITEM — 74
                             NEXT PATIENT — 80
TOTAL TAKEN  1

FIG. 9.

SELECT ITEM:
| DRAINAGE TUBE, #5 |
| GAUZE PAD, SMALL |
| GAUZE PAD, LARGE |
| SYRINGE, SMALL |
| TAPE, ADHESIVE, 1" |
| TAPE, ADHESIVE, 3" |

<<  — 76
>>  — 77
EXIT

FIG. 10.

METHODS AND APPARATUS FOR DISPENSING ITEMS

This is a Continuation of application Ser. No. 08/095,619, filed Jul. 21, 1993, now abandoned.

BACKGROUND OF THE INVENTION

1. Field of the Invention

The invention relates to methods and apparatus for the controlled dispensation and inventorying of items. The invention, which may find particular use in dispensing medical supplies, provides for quick and convenient access to the items, while providing a means for keeping accurate and up-to-date information on the number and type of items dispensed.

2. Description of the Background Art

In medical facilities, large numbers of different medical supply items are stored in supply rooms or on prestocked carts for nurses to access as needed. Inventories of medical supplies used for individual patients are frequently recorded after the particular supply has been taken from the storage unit or area, with such inventories being updated periodically during the day. This results in incomplete and/or inaccurate billing of supplies to patients and requires nurses to dedicate part of their shift hours to inventory control.

A variety of dispensing systems has been used to control access to medical supplies and while providing fully stocked storage areas either in centralized or remote areas of the medical facility. In one such system, referred to as a "cart exchange" system, dispensing carts at remote dispensing stations are periodically exchanged with fully supplied carts. The "used" cart is returned to a central supply area where inventory decreases of particular medical supplies are recorded and the cart is restocked to predetermined "par" levels. These par levels are intended to ensure constant availability of required medical supplies.

In a similar system, the individual carts are not removed from their remote locations in the medical facility. Instead, a large cart holding a variety of medical supplies is circulated throughout the facility to restock individual carts to their par levels.

In either system, the restocking period may be as long as twenty-four hours due to limitations on the hospital staff. This leads to inefficient stocking and inaccurate billing because inventorying of consumed supplies is done relatively long after the supplies are taken from the carts. In view of the deficiencies in existing dispensing systems, it would be advantageous to provide improved methods and apparatus for dispensing items in general and medical supplies in particular. It would be particularly advantageous if the improvements provided for controlled-access to the supplies, with convenient and accurate real-time recording of inventory information.

SUMMARY OF THE INVENTION

The invention provides methods and apparatus for dispensing items from a dispensing unit. According to the invention, the dispensing unit comprises a plurality of locations in which the items are held, a processor in which records corresponding to the items on the unit are stored, and a plurality of item switches corresponding to the locations in which the items are held. The item switches are connected to the processor so that a user of the dispensing unit can input records of items removed from the unit into the processor. The apparatus described is particularly suited for dispensing medical supplies although the apparatus will be usable for other types of items as well.

In preferred embodiments, the unit includes a display panel connected to the processor to display information for a user of the unit. The display panel may conveniently include a touch sensitive screen through which the user may enter information into the processor.

In the preferred embodiment described below, the items are held in a plurality of compartments located on shelves within cabinets on the unit. The shelves themselves are movable and the compartments are defined by movable dividers so that the heights and widths of the compartments can be modified to accommodate items of varying size.

Preferred embodiments will include a plurality of visual indicators, typically in the form of light emitting diodes, corresponding to the locations in which the items are held. Upon selection of a desired item from a list of items held by the unit, the visual indicator corresponding to the item is actuated so that the user can locate the desired item quickly and conveniently with the help of the visual indicator.

In the embodiment described, the processor is capable of storing information regarding what items are held by the unit and in what quantity. The processor may also include information identifying patients located in the vicinity of the dispensing unit and elsewhere in the medical facility in which the unit is used. This information is updated continuously as items are removed from the unit and records are kept to indicate for which patients the items were removed. The information stored in the processor can be transferred over telephone lines to and from central record keeping facilities located elsewhere in the hospital.

BRIEF DESCRIPTION OF THE DRAWINGS

FIG. 7 depicts an intermediate screen as displayed by the processor;

FIG. 8 depicts a name entry screen for entering a new patient name;

FIG. 9 provides a view of the screen displayed by the processor as items are removed from the dispensing unit;

FIG. 10 is an item list as displayed by the processor;

DESCRIPTION OF SPECIFIC EMBODIMENTS

Figure 1:
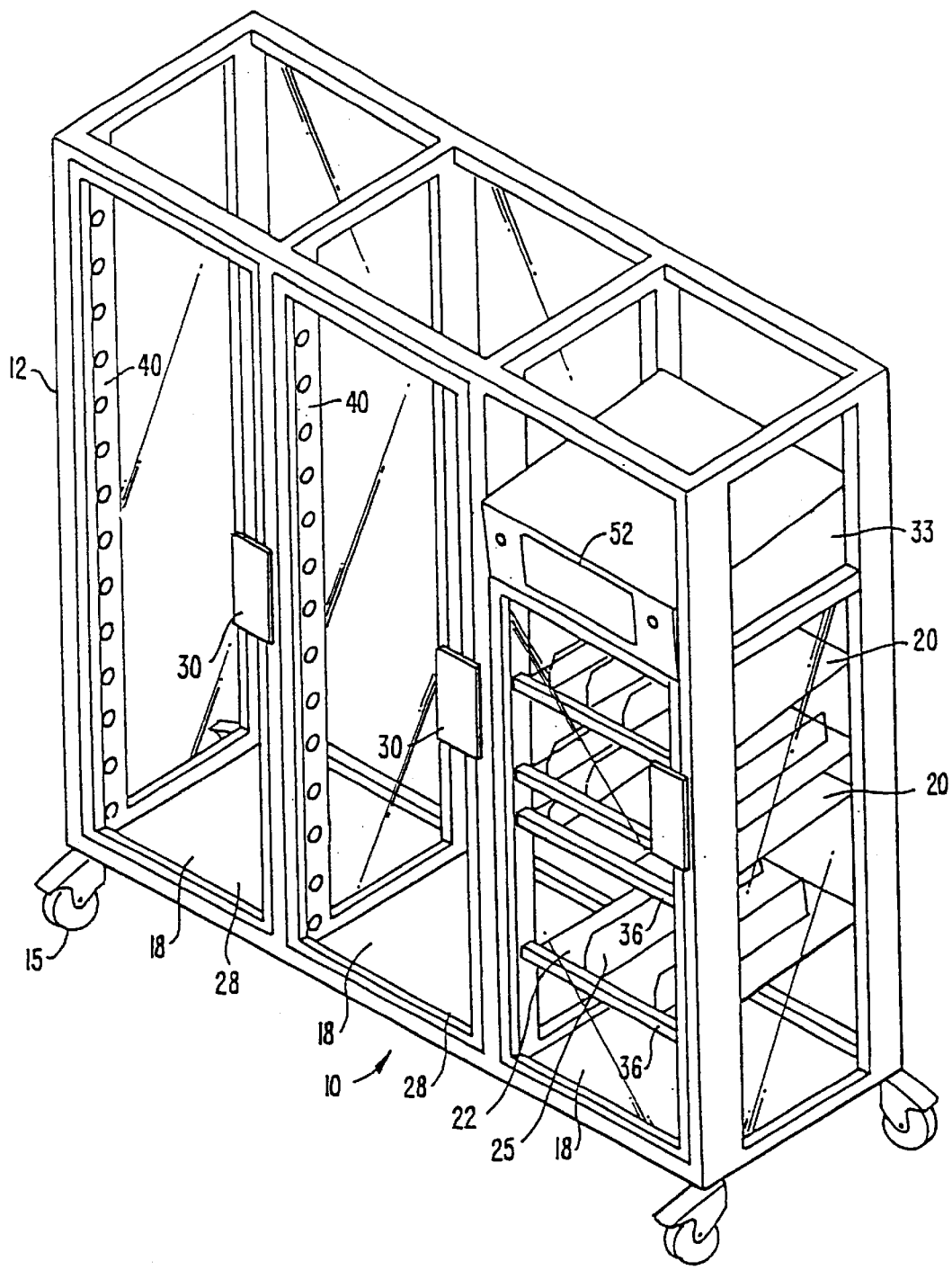
FIG. 1 depicts a dispensing unit according to the present invention.

Apparatus suitable for practicing the methods of the present invention may take the form depicted in FIG. 1. As shown therein, a dispensing unit 10 comprises a cabinet 12 rollable on wheels or casters 15. Cabinet 12 is divided into several (usually three to five) vertical columns 18. The columns 18 are divided by a number of shelves 20. Each shelf 20 may be subdivided into a number of individual compartments 22 by vertical dividers 25 inserted above the shelves. The shelves 20 and dividers 25 are individually movable (or removable) so that the height and width of the compartments 22 can be changed as desired to accommodate a variety of items of varying size. Although the dispensing unit is intended especially for dispensing medical supplies, similar apparatus may also prove useful for dispensing other types of items as well.

Each of the columns 18 is housed behind a door 28, openable by means of a handle 30. Electronically controlled locks behind door handles 30 control access to the items housed in the cabinets in response to commands sent from a processor 33. Operation of the processor unit will be described in detail below. Doors 28, as well as the sides and tops of the cabinets, will usually be made of transparent material so that the items housed in the cabinets are easily visible. Panels made of transparent Lexan® plastic are tough, fairly lightweight and reasonably inexpensive.

The number of shelves 20 and the vertical spacings between the shelves can be varied by inserting or removing individual shelves in columns 18 of cabinet 12. In front of each shelf 20, a switch panel 36 is inserted into ports 38 in the vertical members 40 of cabinet 12. The top of each switch panel 36 rises above the shelf so that the switch panels help to hold the stocked items in their individual storage compartments 22.

Figure 2A:
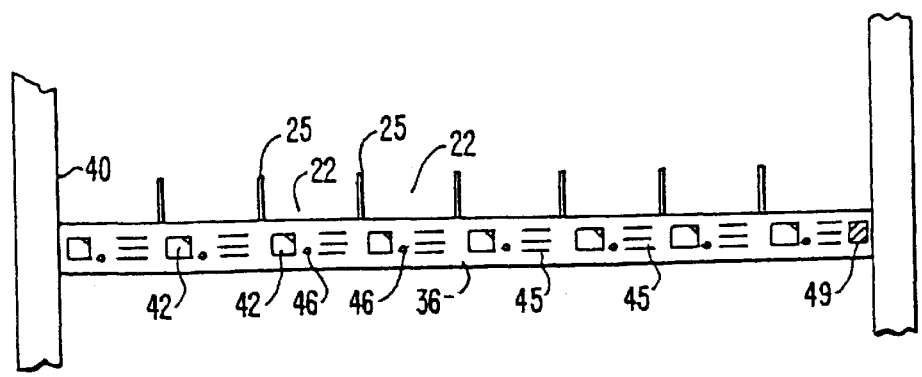
FIGS. 2A and 2B provide a front view of a switch panel at the front of a shelf on which compartments for holding items are defined by a plurality of movable dividers.
Figure 2B:
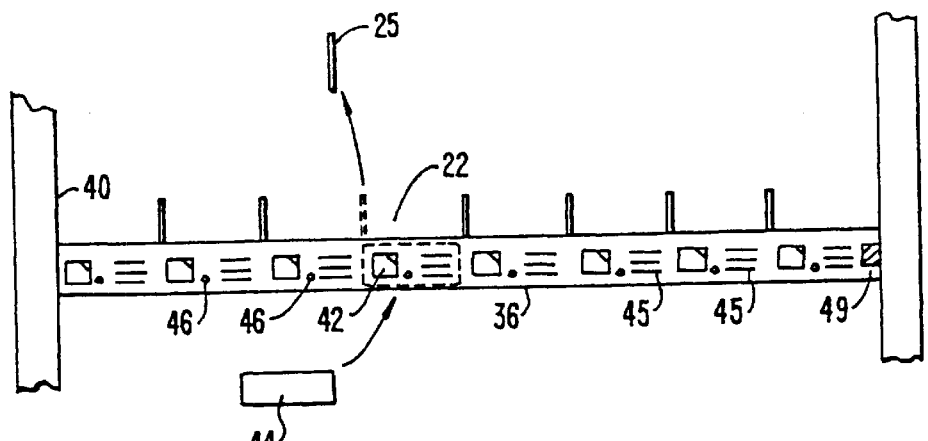

FIGS. 2A and 2B depict one switch panel 36, located at the front of a shelf (not shown), as well as a plurality of removable dividers 25, which define a number of compartments 22 across the width of the shelf. The height of the compartments is defined by the spacing between adjacent shelves as described above. The number and widths of the compartments are defined by inserting or removing dividers 25 as depicted in FIGS. 2A and 2B. FIG. 2A depicts a shelf for which dividers 25 have been inserted to define a compartment 22 corresponding to each one of a number of individual touch-activated item switches 42 on the front of switch panel 36.

If one or more wider compartments are desired to accommodate larger items, then one or more of the dividers 25 may be removed from the shelf as depicted in FIG. 2B. An opaque cover 44 is then snapped into place over a corresponding one of the item switches 42 on switch panel 36. In this way, compartments of various widths may be provided with one exposed item switch 42 associated with each individual compartment 22. The positioning of the item switches 42 relative to the dividers 25 is such that, no matter the width of the compartment, the one exposed item switch corresponding to the compartment is below and near one end (the left end in FIG. 2B) of the compartment. Identifying information such as the item name or item number may be written onto labels 45 on the switch panel 36 in close proximity to the item switches 42.

Touch-activated item switches 42 are used to gather inventory information as items are taken from and restocked into the compartments. Additionally, each item switch 42 has a visual indicator 46 located near it. Visual indicators 46 may be in the form of small light sources, preferably light emitting diodes (LEDs). Finally, each switch panel 36 includes a touch-activated cancel switch 49 near one end (the right end in FIGS. 2A and 2B) of the switch panel. The operation of the switches and visual indicators will be described in more detail below.

Figure 3:
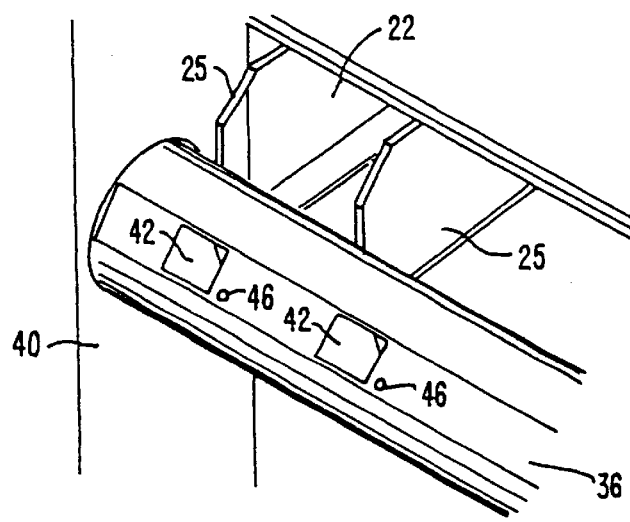
FIG. 3 is a view of end of a switch panel as depicted in FIGS. 2A and 2B.

FIG. 3 depicts a switch panel 36 inserted into one of the vertical members 40 of the dispensing units. Dividers 25 defining compartments 22, item switches 42, and visual indicators 46 are also shown in FIG. 3.

Figure 4:
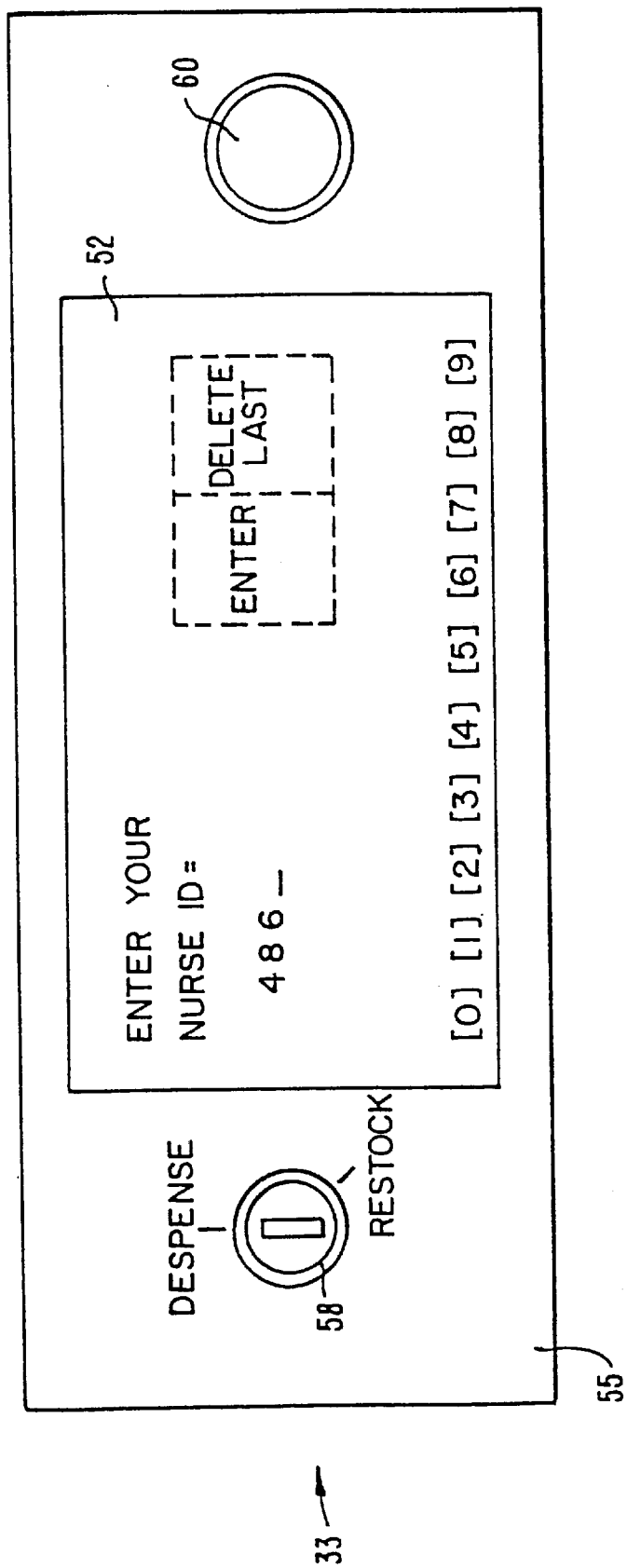
FIG. 4 depicts a front view of the processor of the dispensing unit.

Referring again to FIG. 1, the dispensing apparatus includes a processor 33 including a touch-screen display panel 52. A front view of the processor is shown in FIG. 4. As can be seen in FIG. 4, the front panel 55 of processor 33 houses a touch-screen display panel 52, a keyed locking mechanism 58, and a control override button 60. The functions of each of these elements are described below.

Figure 5:
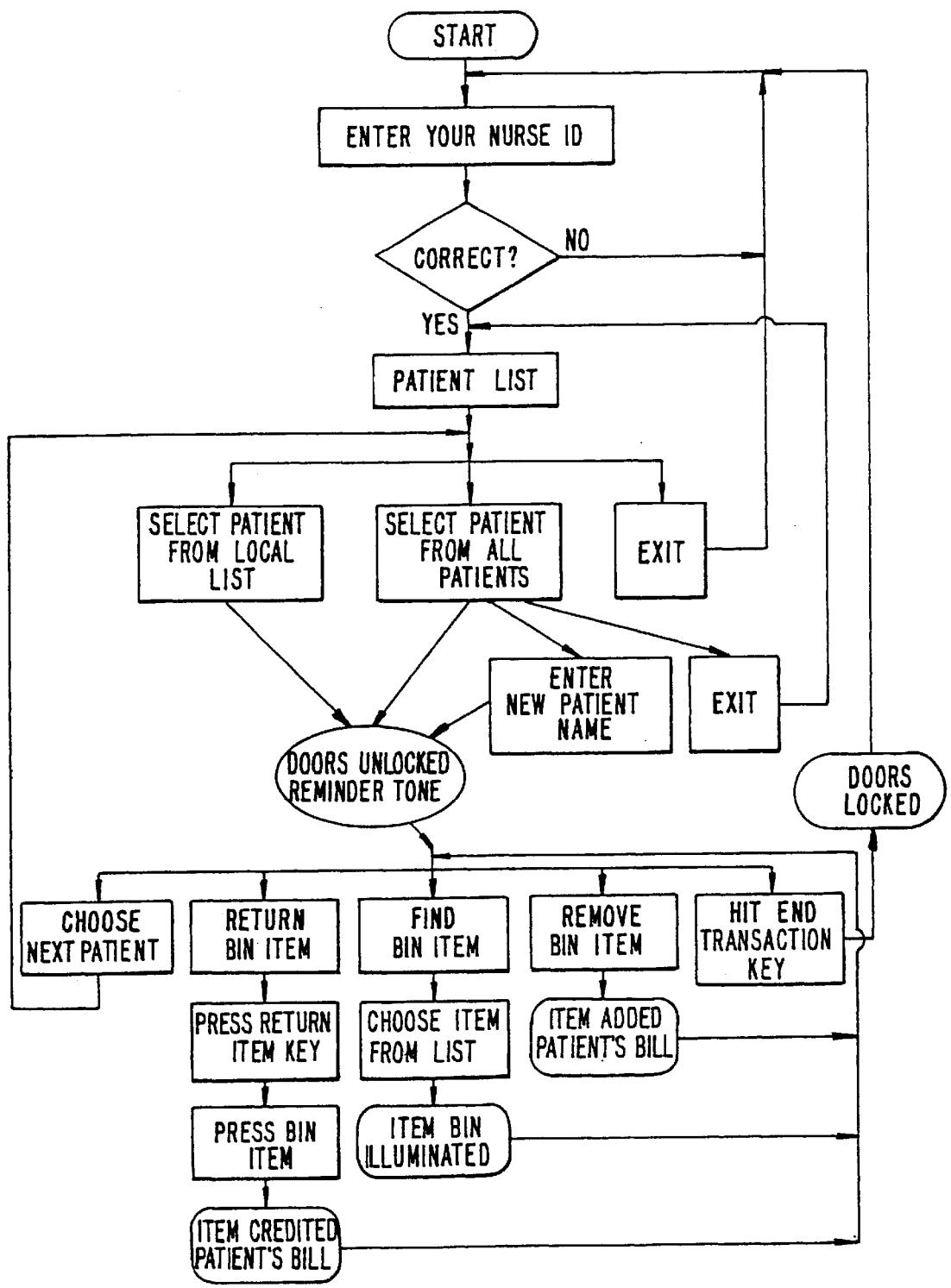
FIG. 5 is a flow chart showing the steps of removing items from the dispensing unit and recording the removal of those items.
Figure 6:
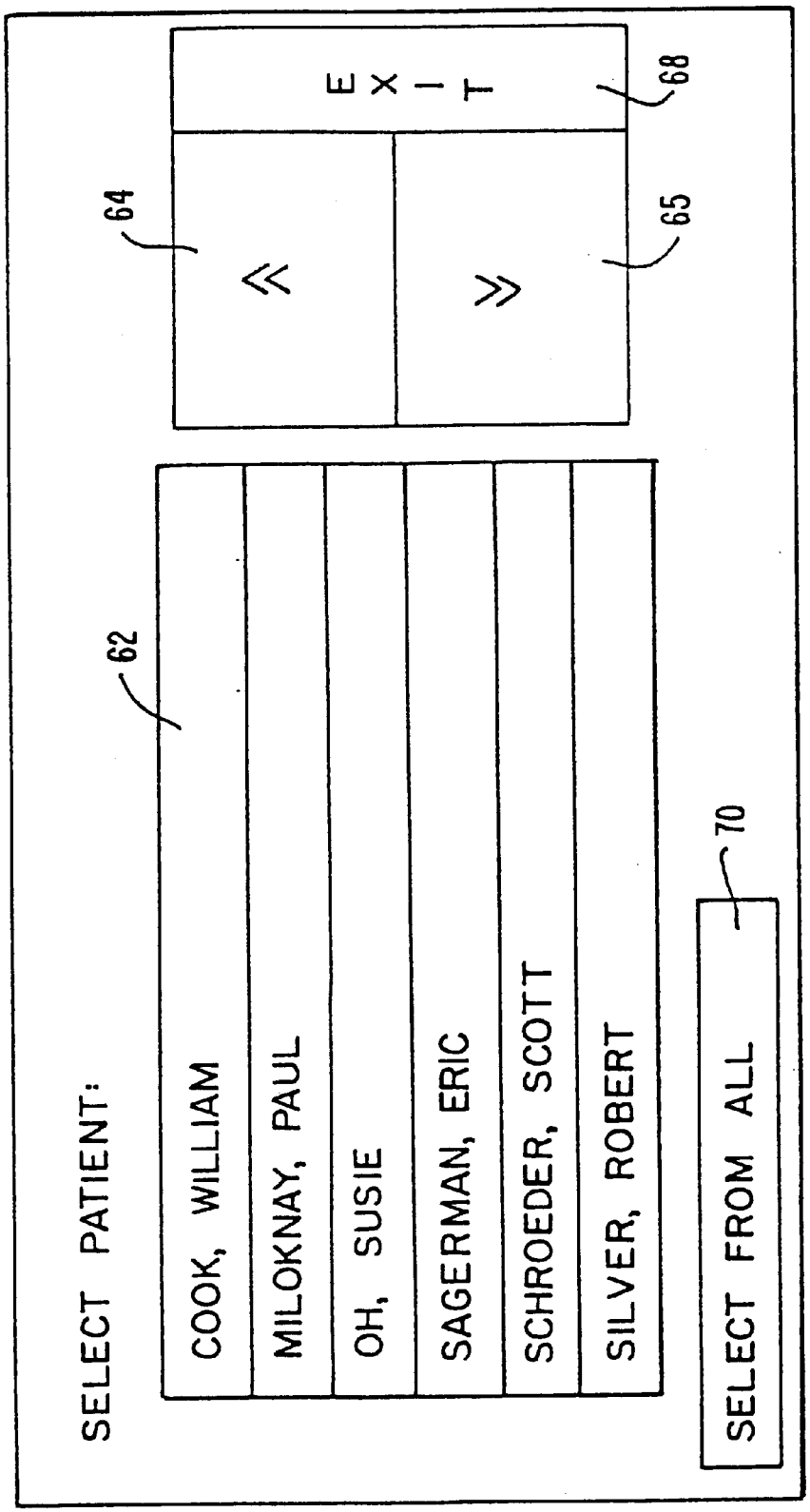
FIG. 6 shows a patient list displayed by the display panel of the processor.

A flow-chart illustrating the functions of the apparatus in its normal dispensing mode is depicted in FIG. 5. In the dispensing mode, typically no key is required to access items from the dispensing unit. Instead, the nurse or other caregiver enters an identifying code into the processor by means of the display panel 52, which is in the form of a touch sensitive screen. During entry of the Nurse ID number the display on the touch sensitive screen is as shown in FIG. 4. Referring back to FIG. 5, after the Nurse ID has been entered and verified by the processor, screen 62 displays a patient list, an example of which is depicted in FIG. 6. Although the touch sensitive screen provides a convenient means for entering information into the processor, other means are possible as well. For example, a conventional keyboard might be used. The touch screen display is particularly advantageous as an input means, however, in that it occupies the same space on the unit as does the display means.

The first patient list displayed is typically a local patient list 62, an alphabetical list of patients in rooms or other areas in the vicinity of that particular dispensing unit. For example, the local patient list may include patients in a single floor or ward of the hospital. Before dispensing medical supplies to a given patient, the caregiver must enter that patient's name into the processor, usually by selecting the name from the local patient list. The caregiver can scroll the patient list up or down by means of scroll controls 64 and 65. The caregiver may also abort the patient selection process by pressing an exit selection 68.

If the desired patient's name is not present on the local patient list, the caregiver may attempt to locate the name from a global patient list. The global patient list typically includes all patients in the hospital. Because the global patient list may be very long, however, an intermediate screen is usually displayed as depicted in FIG. 7. The caregiver accesses the intermediate screen depicted in FIG. 7 by pressing the "Select From All" area 70 depicted in FIG. 6. The intermediate screen prompts the caregiver to touch the first letter of the patient's last name. The unit then displays a list having a format similar to the local patient list depicted in FIG. 6, but instead showing all patients in the hospital who have a last name beginning with the selected letter.

If the caregiver is unable to locate the desired name on the global patient list, the caregiver may return to the screen shown in FIG. 7, and press a "New Patient" selection 72 to initiate entry of a new patient name. In response to the caregiver's request to enter a new patient name, a new patient entry screen is displayed as depicted in FIG. 8. The caregiver then enters the new patient name by touching the appropriate sequence of letters on the screen. The new patient name is stored in memory in the processor for later downloading and reconciling with the hospital's central patient records.

Referring back to FIG. 5, once the patient name has been entered, whether from the local or global patient lists, or from the new patient entry screen, the processor sends signals to unlock the doors of the dispensing unit so that the caregiver can take supplies from the compartments. At the same time, a reminder tone sounds to indicate that the doors are unlocked and a screen is displayed as shown in FIG. 9. The caregiver may then begin removing items from the dispensing unit.

Items may be removed from the dispensing unit according to either of two different methods. First, if the caregiver knows where the desired items are located on the cart, the caregiver may remove the items from their compartments while recording the removal of those items using the item switches located near each compartment. According to the second method, if the caregiver desires assistance in locating a particular item on the cart, the caregiver may select the desired item from an alphabetical list of items on the touch-sensitive display. Upon selecting the desired item, a visual indicator in close proximity to the item is activated, thereby providing the caregiver with a convenient means for locating the item on the dispensing unit. After locating the item, the caregiver may remove the item from the dispensing unit and record the item's removal using the item switch associated with that item. Both methods for removing items and recording their removal from the dispensing unit are described more fully below.

If the caregiver knows the location of the desired item, the caregiver simply opens the door on the dispensing unit, takes the desired item from its compartment, and records the removal of the item from the unit. Removal of the item is recorded simply by pressing the item switch 42 (see FIG. 3) associated with the given item once for each item removed. If the caregiver takes, for example, three gauze pads, the caregiver presses the item switch under the compartment containing the gauze pads three times. The number and type of each item removed are recorded and stored in the processor along with which patient that item has been taken for.

In preferred embodiments, the processor on the dispensing unit is electronically connected to the hospital's central recordkeeping equipment. From time to time, the records corresponding to items taken from the unit are sent to the central record keeping equipment. In this way, records may be maintained in the central equipment that reflect the types and numbers of items taken from and currently held by each dispensing unit in the hospital.

The unit includes means for correcting mistaken entries and returning unneeded items to the unit. If, for example, three gauze pads are taken, but only two are needed, the caregiver may return the remaining pad to the proper compartment. The caregiver then activates cancel switch 49 (see FIG. 2A), located at one end of the switch panel 36 under the item's compartment. After cancel switch 49 has been activated, the caregiver presses the appropriate item switch 42 once for each item returned to the compartment. This causes information to be recorded in the processor so that the unused item is not included on the patient's medical record or bill.

If the caregiver desires assistance to locate an item on the dispensing unit, the care giver may press the area 74 labeled "Find Item" 'on the screen display depicted in FIG. 9. The touch screen then displays an alphabetical list of items like the one shown in FIG. 10. The caregiver can scroll up or down the list by pressing scroll controls 76 or 77 until he locates the desired item on the list. When the caregiver finds the desired item on the list, he selects that item from the list by pressing the area corresponding to that item.

In response, the processor sends a signal to light the visual indicator 46 (see FIG. 3) located below the compartment holding the selected item. The caregiver may then locate the desired item simply by looking for the lighted indicator. Once the caregiver has found the item on the dispensing unit, the caregiver may remove the item and record its removal in the same manner as described above, i.e., by pressing the proper item switch once for each item taken. If the item selected from the alphabetical item list is not on that particular dispensing unit, the processor, instead of lighting a visual indicator, causes the touch screen to display information about where in the hospital that item can be located, e.g, in a particular supply room or on another dispensing unit.

Once the caregiver has finished removing items for a given patient, the caregiver touches the area 80 labelled "Next Patient" (see FIG. 9) on the touch screen. In response, the screen returns to the display depicted in FIG. 6 so that the name of another patient can be entered and items removed for that patient in the same way as described above.

Figure 11:
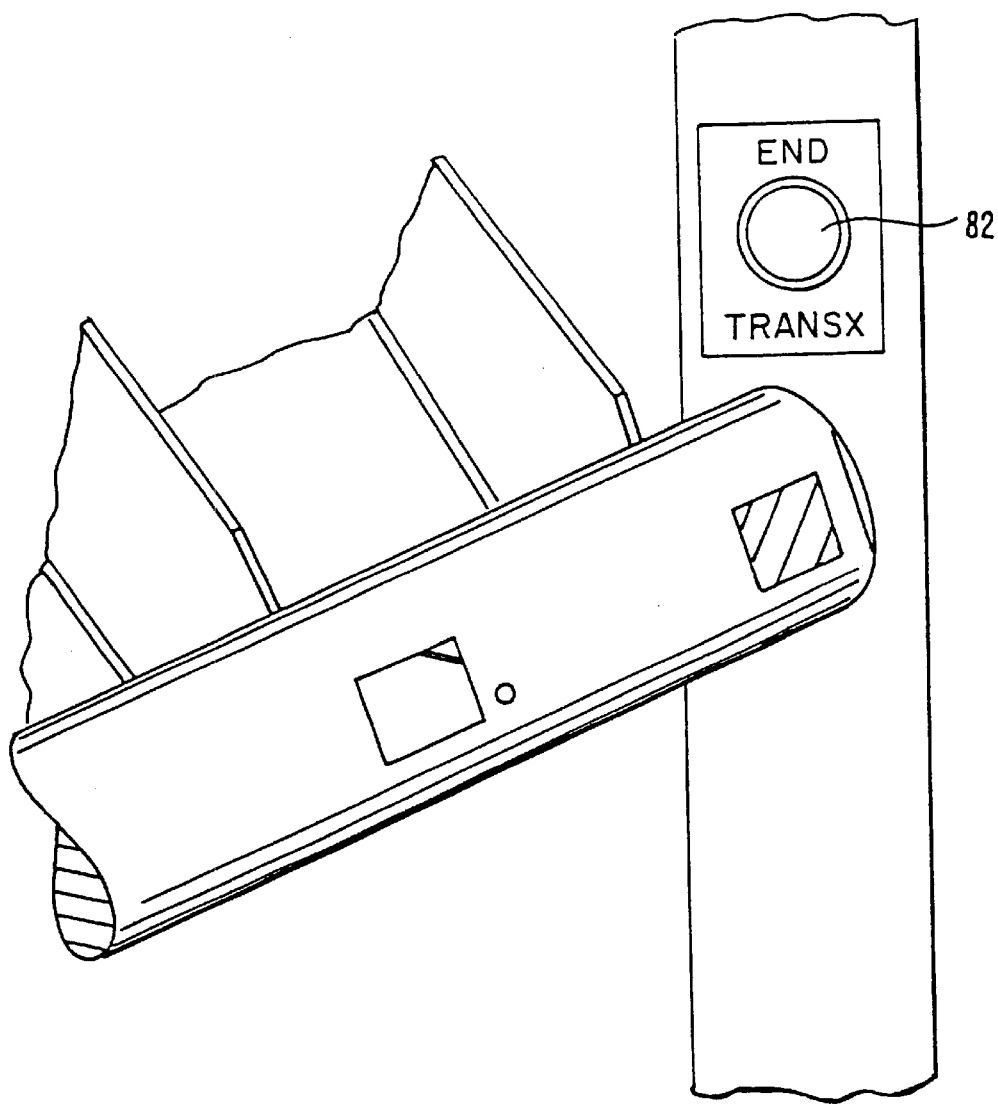
FIG. 11 is a depiction of one end of a switch panel showing a cancel switch and an end transaction switch.

When the caregiver has finished removing items from the compartments, the caregiver presses an end transaction button 82 (see FIG. 11) located inside the cabinet on the vertical member 40 and just above the door handle. As depicted in FIG. 5, this relocks the cabinet doors, and returns the processor to its original state awaiting entry of the next Nurse ID code.

Referring back to FIG. 4, the dispensing unit includes a feature to allow for the immediate dispensation of items in an emergency or other situation in which it is desired to dispense items without stepping through the process described above. An override button 60 is located on front panel 55 of processor 33. Pressing override button 60 bypasses the processor controls to immediately unlock the doors of the dispensing unit. In an emergency, items may be removed from the unit with the removal of those items recorded later. Thus, a means is provided so that the automated inventory control function of the present invention will not prevent prompt access to the medical supplies in an emergency situation.

The dispensing unit will be restocked to replace depleted items as necessary. Restocking of depleted items is normally performed by a supply technician or another member of the hospital staff. The restocking procedure is depicted in the form of a flow chart in FIG. 12. To begin restocking items, the staff member inserts a key into lock 58 (see FIG. 4) on the face of processor 33 and turns the key to switch the processor into a restock mode. While the processor in this embodiment is switchable to the restock mode by means of key lock 58, the modes could be switched by other means such as, for example, a simple switch or an option displayed on the face of the touch sensitive screen. Use of the key lock is advantageous in that it will tend to reduce errors by the staff due, for example, to switching the unit into restock mode unintentionally.

After putting the unit into the restock mode, the staff member enters a Restock ID code into the processor. After the processor confirms that the Restock ID is correct, the staff member selects one of three options, restock, one touch restock, or countback, by entering the desired selection into the processor.

Ordinarily, the one touch restock option provides the quickest and most convenient method for restocking the unit. Before the unit is restocked, a refill report is prepared listing the items taken from the unit since the unit was last restocked. The refill report can be conveniently prepared by the central recordkeeping equipment based on the records stored in the processor and sent to the central recordkeeping equipment as the items were taken from the cart. The staff member gathers the items listed on the refill report and brings them to the cart. At the same time, information corresponding to the refill report is sent to the unit via an electronic connection between the unit and the hospital recordkeeping equipment.

When the technician enters the one touch restock mode, the visual indicator 46 (see FIG. 3) corresponding to the first item on the refill report is activated. The staff member replaces the correct number of items in the proper compartment, which the staff member can find quickly and conveniently with the help of the lighted LED or other visual indicator. After placing the items in the compartment, the staff member records the replacement by pressing the item switch 42 (see FIG. 3) corresponding to that item one time. This indicates to the processor that the number of items shown on the refill report have been placed in the compartment. The LED for that item switches off, and the LED corresponding to the next item on the list switches on. This procedure is repeated for each item on the refill list until all the item compartments are restocked to the desired level.

Figure 12:
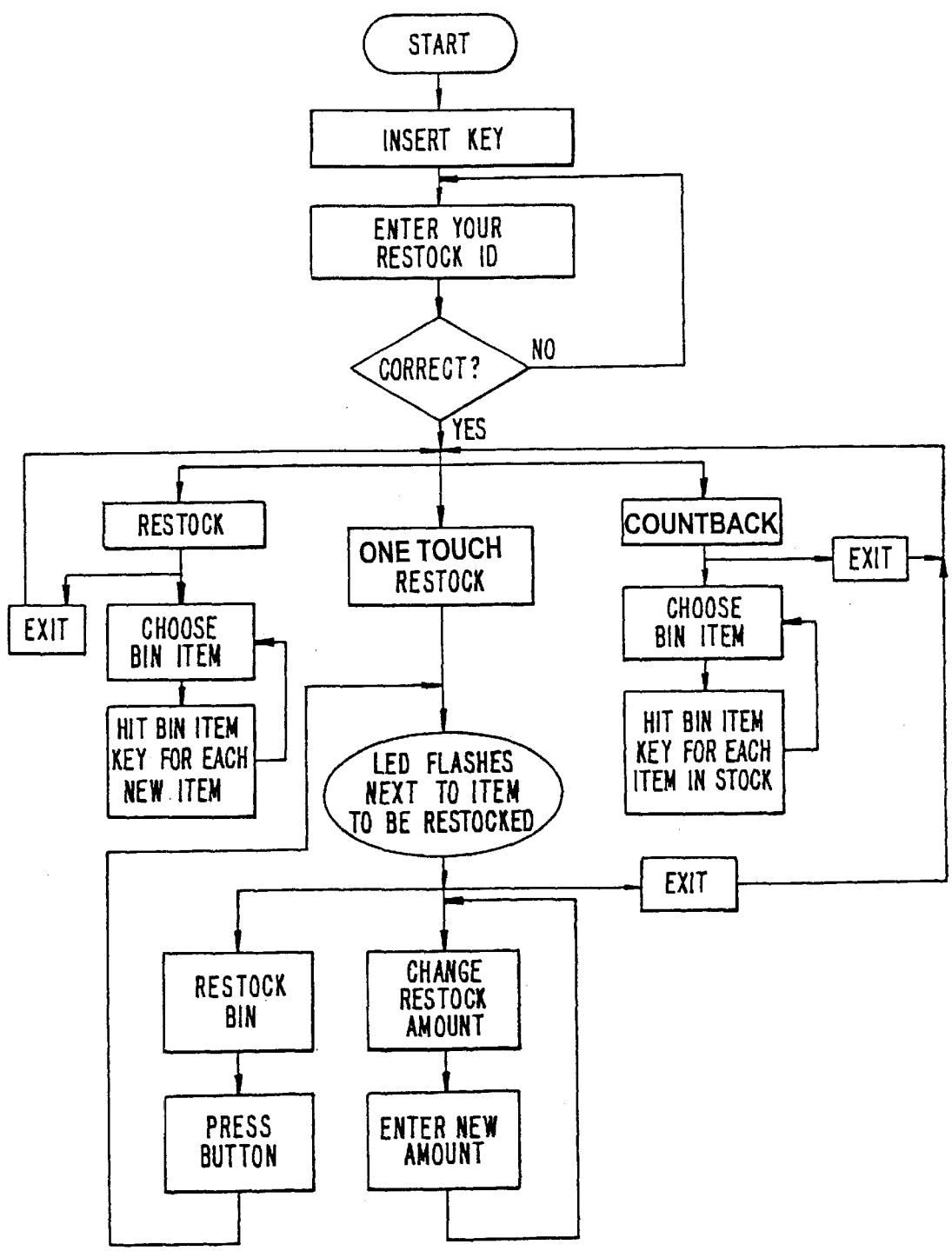
FIG. 12 is a flow chart depicting the procedure for restocking the dispensing unit.

If the number of items actually placed on the unit differs from the number on the refill report, the technician may change the restock amount by making an appropriate entry into the processor through the touch sensitive display panel as indicated in FIG. 12.

The unit may also be restocked without using the one touch restock method. This might be preferred, for example, if only a few items are to be replaced or if no refill report is available. If this is the case, the technician uses the restock option from the display panel. The technician may select the desired item from a list of items on the display panel. The proper LED then lights to assist the technician in finding the appropriate compartment. Alternatively, the technician may locate the desired compartment directly without going through the item list. When the proper compartment is located, the technician places the appropriate number of items into the compartment and presses the corresponding item switch one time for each item placed in the compartment. Note that this method differs from the one touch restock method in that the item switch is pressed once for each item placed in the compartment. In contrast, in the one touch restock method, pressing the item switch one time indicates the replacement of a number of items corresponding to the number shown on the refill report.

Errors made during the restocking procedure may be corrected using the cancel switch 49 (see FIG. 2A). For example, if the refill list indicates that two syringes are to be placed in a given compartment but the staff member mistakenly places three syringes in the compartment, the cancel switch may be used to correct the overstock. The staff member simply removes one syringe from the compartment, activates cancel switch 49, and presses the proper item switch 42 once for each syringe removed. At the end of the restocking session, the cabinet doors are closed and the key removed by the staff member. The processor relocks the doors and the system is reset for the next dispensing session.

Over time, discrepancies will inevitably arise between the number of items supposedly on the dispensing unit and the number of items actually present. It may therefore be desirable for a staff member to periodically reconcile the computer inventory list and the actual number of items. To begin this "count back" procedure, the staff member selects the count back mode by an appropriate entry into the display panel. The staff member then physically counts the number of items actually present in each compartment of the dispensing unit. The staff member presses the proper item switch once for each item on the unit. That number is stored in the processor as the correct and updated number of items actually on the unit. The new numbers are compared with the numbers previously stored in the computer and a discrepancy report is prepared based on differences between the two. This discrepancy report can be used for inventory control and to reconcile patient billing records.

Figure 13:
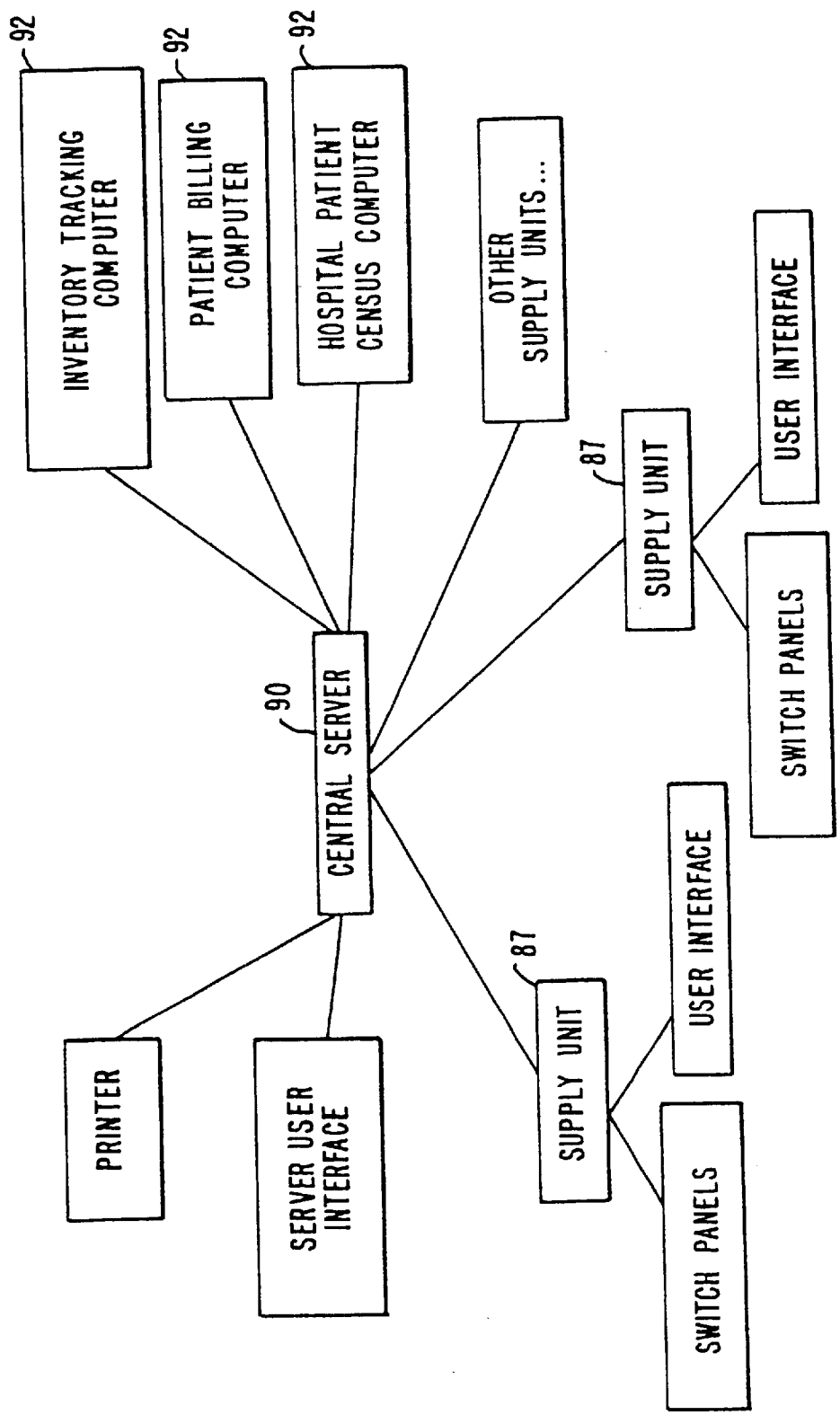
FIG. 13 is a symbolic depiction of the connection between the dispensing unit of the present invention and the hospital's central computer record keeping equipment.

Inventory records kept in the processor include the number of items on the dispensing unit along with a list of items dispensed to individual patients. In preferred embodiments, means will be provided so that the individual dispensing units located at various places in the hospital may communicate data with the central hospital computer system. This is illustrated graphically in FIG. 13, in which a number of dispensing units 87 are connected to a central server 90, which is in turn connected to other elements 92 of the hospital computer systems.

The connection between the dispensing units 87 and the central server 90 may advantageously be made over phone lines in the hospital. In such cases, a modem will typically be included in the processor for making the connection with the central server. If this is done, the central server may call each remote unit periodically to collect updated information for the preparation of inventory records, patient billing records, refill reports, resupply orders, or related purposes.

The invention has been described in considerable detail for purposes of understanding. However, alternative uses for the invention will occur to those skilled in the art. In particular, although the invention has been described as being especially useful for dispensing medical supplies, the invention may be used advantageously in other settings as well. Furthermore, modifications and improvements may be made without departing from the scope and spirit of the invention. Therefore, the above description should not be taken as limiting the scope of the invention. Instead, the scope of the invention should be determined chiefly with reference to the appended claims, along with the full scope of equivalents to which those claims are entitled.

What is claimed is:

1. A unit for dispensing items, said unit comprising:
   a cabinet;
   a plurality of shelves vertically spaced-apart in the cabinet;
   a plurality of touch-activated item switches horizontally spaced-apart on at least some of the shelves, each of the switches being electrically connected to a processor;
   a plurality of movable storage locations on at least some of the shelves, wherein at least one item switch is located adjacent to at least some of the storage locations for inputting records of associated items removed from each storage location.

2. A unit as in claim 1, wherein the storage locations are defined by dividers removably disposed on the shelf.

3. A unit as in claim 1, further comprising a visual display screen connected to the processor.

4. A unit as in claim 3, wherein both the processor and the visual display screen are disposed on the cabinet.

5. A unit as in claim 1, wherein the processor is connected to said item switches to detect and totalize each time an item switch has been actuated.

6. A unit as in claim 5, wherein the processor is disposed on the cabinet.

7. A unit as in claim 5, further comprising at least one visual indicator located next to at least some of the item switches, wherein the visual indicator is connected to the processor so that the indicator is actuated in response to the entry of item identification information into the processor.

8. A unit as in claim 5, further comprising a door having a closed position blocking access to at least some of the shelves and an open position allowing access to said at least some of the shelves.

9. A unit as in claim 8, further comprising a door lock, wherein the door lock is connected to the processor so that the door is unlocked in response to the entry of transaction identification information into the processor.

10. A unit as in claim 9, wherein the transaction identification information includes at least one of user information and patient information.

11. A method for configuring a dispensing unit, said method comprising:

providing a cabinet having a plurality of vertically spaced-apart shelves, wherein at least some of the shelves have horizontally spaced-apart touch-activated item switches thereon with each of said item switches being electrically connected to a processor; and dividing at least one shelf to provide at least a first storage location and a second storage location on said shelf, wherein at least one item switch is located adjacent said first storage location and at least one item switch is located adjacent said second storage location for inputting records of associated items removed from each storage location.

12. A method as in claim 11, wherein the shelf is divided by removably mounting horizontally spaced-apart dividers on the shelf.

13. A method as in claim 11, further comprising positioning at least one shelf within the cabinet, wherein said shelf has a plurality of horizontally spaced-apart item switches thereon.

14. A method as in claim 11, wherein at least two item switches are located adjacent to the first storage location, further comprising placing a cover over one or more item switches so that only a single item switch adjacent to said first storage location remains uncovered.

15. A method as in claim 11, further comprising loading items into said first and second storage locations.

16. A method for configuring and dispensing items from a dispensing unit, said method comprising:

providing a cabinet having a plurality of vertically spaced-apart shelves, wherein at least some of the shelves have horizontally spaced-apart item switches thereon with each of said item switches being electrically connected to a processor;

dividing at least one shelf to provide at least a first storage location and a second storage location on said shelf, wherein at least one item switch is located adjacent said first storage location and another item switch is located adjacent said second storage location;

loading items into said first and second storage locations;

removing items from said first and second storage locations;

manually touching an item switch located adjacent a storage location a number of times equal to the number of items removed therefrom; and maintaining a record of the number of items removed from each storage location by totalizing the number of times the item switch adjacent to said storage location has been touched.

17. A method as in claim 16, further comprising positioning at least one shelf within the cabinet, wherein said shelf has a plurality of horizontally spaced-apart item switches thereon.

18. A method as in claim 16, wherein at least two item switches are located adjacent to the first storage location, further comprising placing a cover over one or more item switches so that only a single item switch adjacent to said first storage location remaining uncovered.

19. A method as in claim 16, further comprising restocking items onto the dispensing units by:

replacing items into said first and second storage locations on the cabinet shelf;

manually touching an item switch located adjacent the storage location to which items are being replaced a number of times equal to the number of items replaced thereto; and maintaining a record of the number of items replaced to each storage location by totalizing the number of times the item switch adjacent to said storage location has been touched.

20. A method as in claim 16, further comprising restocking items onto the dispensing units by:

replacing a predetermined number of items into at least one of said first and second storage locations on the cabinet shelf; and manually touching an item switch adjacent to each storage location to which items have been replaced, wherein a single touch indicates that all of said predetermined number of items have been replaced.

21. A method as in claim 16, wherein the cabinet further has at least one visual indicator located next to at least some of the item switches, further comprising entering item identification information to the processor connected to the indicator.

22. A method as in claim 16, wherein the cabinet further has a door with a closed position blocking access to at least some of the shelves and an open position allowing access to said at least some of the shelves, further comprising entering transactional information into a processor to unlock said door.

23. A method as in claim 22, wherein said transactional information includes at least one of user information and patient information.

* * * * *